United States Patent
Suzuki et al.

(10) Patent No.: US 6,887,549 B2
(45) Date of Patent: May 3, 2005

(54) FRICTION MATERIAL

(75) Inventors: Seiji Suzuki, Gunma (JP); Yasuki Hattori, Gunma (JP); Kazuhide Yamamoto, Gunma (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/875,711

(22) Filed: Jun. 24, 2004

(65) Prior Publication Data

US 2004/0265557 A1 Dec. 30, 2004

(30) Foreign Application Priority Data

Jun. 25, 2003 (JP) .................................... P.2003-180382

(51) Int. Cl.$^7$ ................................................. B32B 3/02
(52) U.S. Cl. ............... 428/66.2; 428/328; 428/694 XS; 428/332; 523/153; 523/155; 523/156; 188/251 A; 192/107 M
(58) Field of Search .............................. 428/66.2, 392, 428/328, 332, 694 XS, 206, 220; 523/153, 155, 156; 188/251 A; 192/107 M

(56) References Cited

U.S. PATENT DOCUMENTS

| 4,403,047 | A | * | 9/1983 | Albertson | .................... 523/153 |
| 6,612,415 | B2 | * | 9/2003 | Yamane | .................. 192/107 M |
| 6,617,375 | B2 | * | 9/2003 | Kobayashi et al. | ......... 523/156 |

FOREIGN PATENT DOCUMENTS

| JP | 58-121325 | 7/1983 |
| JP | 59-40018 | 3/1984 |
| JP | 59-170541 | 9/1984 |
| JP | 61-276827 | 12/1986 |

* cited by examiner

*Primary Examiner*—Merrick Dixon
(74) *Attorney, Agent, or Firm*—Pearne & Gordon LLP

(57) ABSTRACT

A friction material obtainable by molding and curing a material composition having a fibrous base, a binder, and a filler, wherein an amount of sulfate ions extracted from the friction material measured in accordance with JIS K 0127 is about 0.2 mg/g or smaller and the pH of the friction material is about 10.0 or higher and less than about 13.0.

13 Claims, No Drawings

FRICTION MATERIAL

BACKGROUND OF THE INVENTION

1. Technical Field

The present invention relates to a friction material for use as a disk pad, brake lining, clutch facing, or the like, especially as a disk pad, in applications such as motor vehicles, various industrial machines.

2. Background Art

Friction materials are produced by molding and curing friction material compositions that have a fibrous base, binder, and filler as main ingredients. Raw materials for these friction material compositions include, as a part thereof, raw materials that promote rusting (i.e., corrosion-promoting substances) such as raw materials having a low pH (acidic materials) and raw materials containing chlorine ions, sulfate ions, or the like, to secure the performance required of friction materials, such as wear resistance and a high coefficient of friction.

However, in the case of a disk pad, for example, use of such related art raw materials rusts the part of the rotor that contacts the disk pad during stoppage. The partial rust generated on the rotor leads to selective wear in this part with repetitions of braking, resulting in a thickness variation in the rotor rotation direction. Brake vibration thus occurs and causes noise generation.

A technique for removing such corrosion-promoting substances from a friction material is described in JP-A-58-121325, which discloses a related art friction material for use as a clutch face produced through the neutralization and removal via water washing with chlorine ions, sulfate ions, formic acid, and the like, and further, via a rust-preventive treatment that contains an abrasion-resistant powder having a pH of from 6.0 to 10.0. Similar techniques are described in JP-A-59-40018 and JP-A-59-170541. Furthermore, JP-A-61-276827 describes a related art friction material obtained by a method in which silver nitrate, lead nitrate, or the like is reacted with corrosion-promoting substances to fix the corrosion-promoting substances as insoluble substances.

However, the techniques described in JP-A-58-121325, JP-A-59-40018 and JP-A-59-170541 necessitate a prolonged treatment and prolonged removal because the related art friction materials have a microporous structure consisting of a fibrous base, binder, and filler as main ingredients. Furthermore, the technique described in JP-A-61-276827 necessitates a new apparatus and has problems concerning treatment and water washing because the friction material itself is treated.

SUMMARY OF THE INVENTION

An object of the invention is to provide a friction material which retains the performances required of friction materials, such as wear resistance and a high coefficient of friction, and is simultaneously effective in preventing a mating material, e.g., a rotor, flywheel, or pressure plate, from partly rusting especially under high-temperature high-humidity conditions. However, the present invention is not limited to this objective, nor is any objective needed for the present invention.

The applicant investigated techniques for removing known corrosion-promoting substances as much as possible from raw materials for a friction material composition while coping with the performances required of friction materials. In the course of these investigations, the inventor discovered that the removal of sulfides from raw materials is difficult because sulfides are added to enable the friction material to retain the thermal stability of wear resistance and of a coefficient of friction, and the addition thereof is becoming more important to satisfy customers' advancing performance requirements.

It has been further found that with respect to the pH regulation of the whole friction material, a higher pH value (higher alkalinity) than those in the range which has been regarded as proper is effective in preventing mating materials from rusting.

Namely, for preventing partial rusting of a mating material, it is important to regulate the amount of sulfate ions mainly in sulfides and in the friction material, and it is effective to regulate the friction material to have a pH in a given range that is higher than those previously regarded as proper.

Specifically, in the present invention a friction material that retains the performances required of friction materials, such as wear resistance and a high coefficient of friction, and is simultaneously effective in preventing a mating material from partly rusting is provided by properly selecting or treating sulfides in the raw-material stage, without the necessity of conducting a neutralization, water washing, or fixing treatment in the product stage, and by regulating a friction material so that the amount of sulfate ions extracted therefrom and the pH thereof within given ranges.

Namely, the invention provides the following friction materials.

(1) A friction material obtainable by molding and curing a material composition comprising:
 a fibrous base;
 a binder; and
 a filler,
 wherein an amount of sulfate ions extracted from the friction material measured in accordance with JIS K 0127 is about 0.2 mg/g or smaller and the pH of the friction material is about 10.0 or higher and less than about 13.0.

(2) The friction material according to the above (1), wherein the filler comprises two or more kinds of sulfides, wherein the content of the sulfides having sulfate ions extracted therefrom in an amount of about 10 mg/g or smaller and having a pH of about 4.0 or higher is 80% by volume or more based on the total volume of said two or more kinds of sulfides.

(3) The friction material according to the above (2), wherein said two or more kinds of sulfides comprise iron sulfide, zinc sulfide, copper sulfide, bismuth sulfide, manganese sulfide, lead sulfide, molybdenum disulfide or molybdenum trisulfide.

(4) The friction material according to the above (1), wherein the filler comprises one or more kinds of sulfides having sulfate ions extracted from the friction material in an amount of about 10 mg/g or smaller and having a pH of about 4.0 or higher.

(5) The friction material according to the above (4), wherein said one or more kinds of sulfides comprise iron sulfide, zinc sulfide, copper sulfide, bismuth sulfide, manganese sulfide, lead sulfide, molybdenum disulfide or molybdenum trisulfide.

(6) A friction material obtainable by molding and curing a composition comprising:
 a fibrous base;
 a binder; and a filler, wherein the filler comprises two or more kinds of sulfides, wherein the content of the sulfides having sulfate ions extracted therefrom measured in accordance with JIS K 0127 in an amount of about 10 mg/g or smaller and having a pH of about 4.0 or higher is 80% by volume or more based on the total volume of said two or more kinds of sulfides, and wherein the total amount of the sulfides is from about 0.1 to 9% by volume based on the total volume of the friction material composition.

(7) The friction material according to the above (6), wherein the total amount of the sulfides is from about 4% to 9% by volume based on the total volume of the friction material composition.

(8) The friction material according to the above (6), wherein one or more alkaline raw materials having a pH of about 11.0 or higher are used in an amount from about 0.5 to 6% by volume based on the total volume of the friction material composition.

(9) The friction material according to the above (8), wherein said amount is from about 1 to 3% by volume based on the total volume of the friction material composition.

(10) A friction material obtainable by molding and curing a composition comprising:

a fibrous base;

a binder; and a filler, wherein the filler comprises one or more sulfides having sulfate ions extracted from the friction material measured in accordance with JIS K 0127 in an amount of about 10 mg/g or smaller and having a pH of about 4.0 or higher, and wherein the total amount of the one or more sulfides is from about 0.1 to 9% by volume based on the total volume of the friction material composition.

(11) The friction material according to the above (10), wherein the total amount of the sulfides is from about 4% to 9% by volume based on the total volume of the friction material composition.

(12) The friction material according to the above (10), wherein one or more kinds of alkaline raw materials having a pH of about 11.0 or higher are used in an amount from about 0.5 to 6% by volume based on the total volume of the friction material composition.

(13) The friction material according to the above (12), wherein said amount is from about 1 to 3% by volume based on the total volume of the friction material composition.

DETAILED DESCRIPTION OF THE INVENTION

The friction material of the present invention is obtained by molding and curing a friction material composition comprising a fibrous base, a binder, and a filler as main ingredients. This friction material has been regulated so that the amount of sulfate ions extracted therefrom as measured in accordance with JIS K 0127 (a general standard that includes rules from ion chromatographic analysis) is about 0.2 mg/g or smaller and the pH thereof is about 10.0 or higher and less than about 13.0.

As long as the amount of sulfate ions extracted and the pH are within these ranges, the partial rusting of a mating material can be substantially prevented and, simultaneously, the performances required of friction materials, such as wear resistance and a high coefficient of friction, can be secured.

In the invention, attention is directed also to the amount of sulfate ions extracted from sulfides to be used as a filler.

Examples of the sulfides include iron sulfide, zinc sulfide, copper sulfide, bismuth sulfide, manganese sulfide, lead sulfide, molybdenum disulfide, and molybdenum trisulfide.

When two or more sulfides are added in the present invention, about 80% by volume or more of all the sulfides are preferably accounted for by two or more sulfides in which the amount of sulfate ions extracted therefrom as measured in accordance with JIS K 0127 is about 10 mg/g or smaller and which has a pH of about 4.0 or higher.

More preferred is the case in which one or more sulfides are added and the sulfides consist only of one or more sulfides in which the amount of sulfate ions extracted therefrom as measured in accordance with JIS K 0127 is about 10 mg/g or smaller and which has a pH of about 4.0 or higher. When sulfides are added as a filler to satisfy these ranges, the partial rusting of a mating material is prevented.

Examples of such sulfides that have a sulfate ion extraction of about 10 mg/g or smaller and a pH of about 4.0 or higher include (but are not limited to) the following commercial products: a ferrosulfur powder (manufactured by Hosoi Chemical Industry Co., Ltd.) as iron sulfide; UP-50 (manufactured by THOMPSON CREEK MINING LTD ENDAKO MINES) as molybdenum disulfide ($MoS_2$), and Sachtolith HD (manufactured by SACHTLEBEN) as zinc sulfide. These may be used alone or in any combination.

The amount of the sulfides to be added is preferably from about 0.1 to 9% by volume, especially from about 4 to 9% by volume, based on the whole friction material composition. When the amount thereof is too small, customers' requirements concerning wear resistance cannot be satisfied. Too large amounts thereof result in a decrease in the coefficient of friction.

In the present invention, the amount of sulfate ions extracted from the friction material is measured in accordance with JIS K 0127. Special measuring method is described as follows. A sample of 25×25×5 mm is boiled at 90±10° C. for 8 hours. After cooling, the volume is adjusted to 100 mL and the sulfate ions ($SO_4^{2-}$) (mg/l) are determined by ion chromatography. Then, the found value is converted to extraction per g of the sample.

Furthermore, it is desirable in the present invention to add one or more alkaline raw materials having a pH of about 11.0 or higher to regulate the pH of the whole friction material. Examples thereof include (but are not limited to) slaked lime (calcium hydroxide), sodium hydroxide, potassium hydroxide, potassium carbonate, and sodium carbonate. Slaked lime is preferred of these because it is easy to handle.

When an alkaline raw material having a pH lower than about 11.0 is used, it is contained in a friction material composition in too large an amount and there is hence the possibility that the performances required of friction materials, such as a coefficient of friction and wear resistance, cannot be secured. Those raw materials can be used alone or in any combination.

The amount of the alkaline raw materials having a pH of about 11.0 or higher to be contained is preferably from about 0.5 to 6% by volume, more preferably from about 1 to 3% by volume, based on the whole friction material composition. As long as the amount thereof is within this range, the pH of the whole friction material can be regulated and the partial rusting of a mating material can be substantially prevented.

Examples of the other raw materials used for constituting the friction material of the invention include ordinary raw materials for friction material compositions.

Examples of the fibrous base include fibrous bases in ordinary use in friction materials. Specific examples thereof include fibers of metals such as steel, stainless steel, copper, brass, bronze, and aluminum; inorganic fibers such as potassium titanate fibers, glass fibers, rock wool, artificial mineral fibers, wollastonite, sepiolite, and attapulgite; and organic fibers such as aramid fibers, carbon fibers, polyimide fibers, cellulose fibers, and acrylic fibers. These fibrous materials can be used alone or in any combination. The amount of the fibrous base to be added is preferably from about 5 to 60% by volume, more preferably from about 10 to 50% by volume, based on the whole friction material.

The binder can be a known binder in ordinary use in friction materials. Examples thereof include phenolic resins, NBR-modified high-ortho phenolic resins, NBR-modified phenolic resins, melamine resins, epoxy resins, NBRs, and acrylic rubbers.

These can be used alone or in any combination thereof. The amount of the binder to be added is preferably about 10% by volume or larger, more preferably from about 10 to 30% by volume, even more preferably from about 12 to 25% by volume, based on the whole friction material.

Examples of the filler include organic fillers and inorganic fillers. Examples of the organic fillers include cashew dust, tire riku, rubber dust (rubber powder or particles), nitrile rubber (unvulcanized), and acrylic rubber dust (vulcanized). These can be used alone or in any combination. Examples of inorganic fillers other than sulfides include barium sulfate, calcium carbonate, vermiculite, graphite, coke, and mica, and further include powders of metals such as iron, copper, stainless steel, and aluminum.

These can be used alone or in any combination. The amount of fillers to be added is preferably from about 40 to 85% by volume, more preferably from about 50 to 80% by volume, based on the whole friction material composition.

A process for producing the friction material of the invention comprises evenly mixing the ingredients described above by a mixing machine such as a Henschel mixer, Ledige mixer, or Eirich mixer, preforming the mixture in a mold, and then molding this preform from about 3 to 10 minutes at a molding temperature from about 403 to 453 K and a molding pressure from about 15 to 49 MPa.

Subsequently, the molding obtained is heat-treated (postcured) at a temperature from about 423 to 523 K for about 2 to 10 hours and then optionally subjected to spray coating, baking, and polishing to obtain a finished product.

In the case of producing a disk pad for motor vehicles or the like, the preform is placed on an iron or aluminum plate which has previously undergone cleaning, surface treatment, and adhesive coating. The preform in this state is molded in a mold, heat-treated, spray-coated, baked, and polished to produce the disk pad. The friction material of the invention can be extensively used in various applications such as the brake linings, clutch facings, disk pads, and brake blocks of motor vehicles, large trucks, railway vehicles, various industrial machines, but not limited thereto, as would be understood by one skilled in the art.

EXAMPLES

The invention will be explained below in detail by reference to Examples and Comparative Examples, but the invention should not be construed as being limited to the Examples.

A friction material composition having each of the makeups shown in Table 1 was mixed by means of a Ledige mixer for 5 to 20 minutes and preformed by pressing it in a pressure mold at 30 MPa for 1 minute. This preform was molded for 7 minutes under the conditions of a molding temperature of 423 K and a molding pressure of 40 MPa, subsequently heat-treated (postcured) at 493 K for 5 hours, and then coated, baked, and polished. Thus, automobile brake pads of Examples and Comparative Examples were produced. The raw materials and brake pads were analyzed/tested under the following conditions to examine the performances thereof. The results obtained are shown in Table 1.

(1) Non-Rusting Performance

Rubbing (dynamo) conditions:

100 km/h; 2.9 m/s$^2$; 100° C.; 200 times.

Standing in thermo-hygrostatic chamber:

The pad clamped with the rotor is allowed to stand in a 50° C.×95% thermo-hygrostatic chamber for 2 weeks.

Measurement of rotor rust depth:

Measured with EPMA (electron probe microanalyzer).

The depth of the rust is measured through "Fe+O" mapping and examination of an SEM (scanning electron microscope) photograph.

A: smaller than 10 μm.

B: from 10 μm to smaller than 50 μm.

C: from 50 μm to smaller than 100 μm.

D: 100 μm or lager.

(2) Disk Pad Wear

In accordance with JASO C406, which is a standard published by the Japanese Society of Automotive Engineers, Inc as related to chassis and brake components, for braking devices of passenger cars, to measure disk pad wear by a dynamometer.

A: less than 0.5 mm.

B: from 0.5 mm to less than 0.75 mm.

C: from 0.75 mm to less than 1.0 mm.

D: 1.0 mm or more.

(3) Effectiveness

In accordance with JASO C406. Average of values of second effectiveness.

A: larger than 0.42.

B: larger than 0.37 and not larger than 0.42.

C: larger than 0.32 and not larger than 0.37.

D: 0.32 or smaller.

(4) Sulfate Ion Extraction from Pad

In accordance with JIS K 0127.

A sample of 25×25×5 mm is boiled at 90±10° C. for 8 hours.

After cooling, the volume is adjusted to 100 mL and the sulfate ions ($SO_4^{2-}$) (mg/l) are determined by ion chromatography.

The found value is converted to extraction per g of the sample.

(5) Sulfate Ion Extraction from Raw Material

The same as in (4). The sample examined is used in an amount of from 0.05 to 0.3 g.

(6) pH of Pad

In 200 mL of pure water is dispersed 6 g of a pad pulverized. This dispersion is examined with a pH meter.

(7) pH of Raw Material

The same as in (6). Each raw material is used in an amount of 6 g.

TABLE 1

| | Sulfate ion extraction mg/g | pH | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
| Stainless-steel fibers | <5 | — | 5.0 | 5.0 | 5.0 | 5.0 | 5.0 | 5.0 | 5.0 | 5.0 |
| Bronze fibers | <5 | — | 9.0 | 9.0 | 9.0 | 9.0 | 9.0 | 9.0 | 9.0 | 9.0 |
| Iron sulfide (artificial FeS) | <5 | 5.1 | 3.0 | 6.0 | — | 3.0 | 3.0 | 3.0 | — | — |
| Iron sulfide (natural FeS$_2$) | 56 | 5.0 | — | — | — | — | — | — | 3.0 | 3.0 |
| Molybdenum disulfide (UP50) | <5 | 6.2 | 3.0 | — | 6.0 | 3.0 | 3.0 | — | 3.0 | — |
| Molybdenum disulfide (UP10) | <5 | 3.0 | — | — | — | — | — | 3.0 | — | 3.0 |
| Zinc sulfide | <5 | 6.9 | 2.0 | 2.0 | 2.0 | 2.0 | 2.0 | 2.0 | 2.0 | 2.0 |
| Slaked lime | <5 | 13.0 | 2.0 | 2.0 | 2.0 | 5.0 | 8.0 | 2.0 | 2.0 | 2.0 |
| Aramid fibers | <5 | — | 3.0 | 3.0 | 3.0 | 3.0 | 3.0 | 3.0 | 3.0 | 3.0 |
| Barium sulfate | <5 | — | 25.0 | 25.0 | 25.0 | 22.0 | 19.0 | 25.0 | 25.0 | 25.0 |
| Vermiculite | <5 | — | 10.0 | 10.0 | 10.0 | 10.0 | 10.0 | 10.0 | 10.0 | 10.0 |
| Triiron tetroxide | <5 | — | 3.0 | 3.0 | 3.0 | 3.0 | 3.0 | 3.0 | 3.0 | 3.0 |
| Graphite | <5 | — | 9.0 | 9.0 | 9.0 | 9.0 | 9.0 | 9.0 | 9.0 | 9.0 |
| Phenolic resin | <5 | — | 15.0 | 15.0 | 15.0 | 15.0 | 15.0 | 15.0 | 15.0 | 15.0 |
| Cashew dust | <5 | — | 7.0 | 7.0 | 7.0 | 7.0 | 7.0 | 7.0 | 7.0 | 7.0 |
| Rubber | <5 | — | 3.0 | 3.0 | 3.0 | 3.0 | 3.0 | 3.0 | 3.0 | 3.0 |
| Alumina | <5 | — | 1.0 | 1.0 | 1.0 | 1.0 | 1.0 | 1.0 | 1.0 | 1.0 |
| Total (vol %) | | | 100.0 | 100.0 | 100.0 | 100.0 | 100.0 | 100.0 | 100.0 | 100.0 |
| Sulfate ion extraction, mg/g | | | ≤0.2 | ≤0.2 | ≤0.2 | ≤0.2 | ≤0.2 | ≤0.2 | 0.5 | 0.5 |
| PH | | | 10.5 | 10.6 | 10.4 | 12.0 | 12.7 | 9.4 | 10.6 | 9.5 |
| Non-rusting performance | | | B | B | B | B | B | D | D | DD |
| Effectiveness | | | A | A | B | B | C | A | A | A |
| Disk pad wear | | | A | B | A | B | C | A | A | B |

Iron sulfide (artificial FeS): ferrosulfur powder manufactured by Hosoi Chemical Industry Co., Ltd.
Molybdenum disulfide (UP-50): manufactured by THOMPSOM CREEK MINING LTD ENDAKO MINES.
Molybdenum disulfide (UP-10): manufactured by THOMPSOM CREEK MINING LTD ENDAKO MINES.
Zinc sulfide: Sachtolith HD (manufactured by SACHTLEBEN).

The present invention has various advantages. For example, but not by way of limitation, the friction material of the invention retains the performances required of friction materials, such as wear resistance and a high coefficient of friction, and is simultaneously effective in preventing a mating material, e.g., a rotor, drum, flywheel, or pressure plate, from partly rusting especially under high-temperature high-humidity conditions. This friction material can be produced without necessitating any special apparatus, e.g., a neutralization apparatus, unlike the friction materials according to related-art techniques.

While the invention has been described in detail and with reference to specific embodiments thereof, it will be apparent to one skill in the art that various changes and modifications can be made therein without departing from the spirit and scope thereof. All references cited herein are incorporated in their entirety.

This application claims foreign priority based on Japanese patent application no. JP 2003-180382, filed on Jun. 25, 2003, the content of which is incorporated herein in its entirety by reference.

What is claimed is:

1. A friction material obtainable by molding and curing a material composition comprising:
   a fibrous base;
   a binder; and
   a filler,
   wherein an amount of sulfate ions extracted from the friction material measured in accordance with JIS K 0127 is about 0.2 mg/g or smaller and the pH of the friction material is about 10.0 or higher and less than about 13.0.

2. The friction material of claim 1, wherein the filler comprises two or more kinds of sulfides, wherein the content of the sulfides having sulfate ions extracted therefrom in an amount of about 10 mg/g or smaller and having a pH of about 4.0 or higher is 80% by volume or more based on the total volume of said two or more kinds of sulfides.

3. The friction material of claim 2, wherein said two or more kinds of sulfides are selected from the group consisting of iron sulfide, zinc sulfide, copper sulfide, bismuth sulfide, manganese sulfide, lead sulfide, molybdenum disulfide or molybdenum trisulfide.

4. The friction material of claim 1, wherein the filler comprises one or more kinds of sulfides having sulfate ions extracted from the friction material in an amount of about 10 mg/g or smaller and having a pH of about 4.0 or higher.

5. The friction material of claim 4, wherein said one or more kinds of sulfides are selected from the group consisting of iron sulfide, zinc sulfide, copper sulfide, bismuth sulfide, manganese sulfide, lead sulfide, molybdenum disulfide or molybdenum trisulfide.

6. A friction material obtainable by molding and curing a composition comprising:
   a fibrous base;
   a binder; and
   a filler,
   wherein the filler comprises two or more kinds of sulfides, wherein the content of the sulfides having sulfate ions extracted therefrom measured in accordance with JIS K 0127 in an amount of about 10 mg/g or smaller and having a pH of about 4.0 or higher is 80% by volume or more based on the total volume of said two or more kinds of sulfides, and wherein the total amount of the sulfides is from about 0.1 to 9% by volume based on the total volume of the friction material composition.

7. The friction material of claim 6, wherein the total amount of the sulfides is from about 4% to 9% by volume based on the total volume of the friction material composition.

8. The friction material of claim 6, wherein one or more alkaline raw materials having a pH of about 11.0 or higher are used in an amount from about 0.5 to 6% by volume based on the total volume of the friction material composition.

9. The friction material of claim 8, wherein said amount is from about 1 to 3% by volume based on the total volume of the friction material composition.

10. A friction material obtainable by molding and curing a composition comprising:

a fibrous base;

a binder; and a filler, wherein the filler comprises one or more sulfides having sulfate ions extracted from the friction material measured in accordance with JIS K 0127 in an amount of about 10 mg/g or smaller and having a pH of about 4.0 or higher, and wherein the total amount of the one or more sulfides is from about 0.1 to 9% by volume base on the total volume of the friction material composition.

11. The friction material of claim 10, wherein the total amount of the sulfides is from about 4% to 9% by volume based on the total volume of the friction material composition.

12. The friction material of claim 10, wherein one or more kinds of alkaline raw materials having a pH of about 11.0 or higher are used in a amount from about 0.5 to 6% by volume based on the total volume of the friction material composition.

13. The friction material of claim 12, wherein said amount is from about 1 to 3% by volume based on the total volume of the friction material composition.

* * * * *

UNITED STATES PATENT AND TRADEMARK OFFICE
CERTIFICATE OF CORRECTION

PATENT NO. : 6,887,549 B2
DATED : May 3, 2005
INVENTOR(S) : Suzuki et al.

It is certified that error appears in the above-identified patent and that said Letters Patent is hereby corrected as shown below:

Column 10,
Line 1, please delete "base" and insert therefor -- based --.

Signed and Sealed this

Twelfth Day of July, 2005

JON W. DUDAS
*Director of the United States Patent and Trademark Office*